US012811236B2

(12) United States Patent
Tarras et al.

(10) Patent No.: US 12,811,236 B2
(45) Date of Patent: Nov. 24, 2026

(54) BATTERY ASSEMBLY FOR WIRELESS FIELD DEVICES

(71) Applicant: Rosemount Inc., Shakopee, MN (US)

(72) Inventors: Ryan C. Tarras, Savage, MN (US); Greg E. Gindele, Maple Lake, MN (US); Cory M. Robinson, Mayer, MN (US); Nathan K. Holm, Mound, MN (US); Brandon L. Swick, Eden Prairie, MN (US); Hun Chhuoy, Savage, MN (US)

(73) Assignee: Rosemount Inc., Shakopee, MN (US)

( * ) Notice: Subject to any disclaimer, the term of this patent is extended or adjusted under 35 U.S.C. 154(b) by 341 days.

(21) Appl. No.: 18/494,884

(22) Filed: Oct. 26, 2023

(65) Prior Publication Data

US 2025/0141026 A1 May 1, 2025

(51) Int. Cl.

| | |
|---|---|
| ***H01M 50/264*** | (2021.01) |
| ***G01K 1/024*** | (2021.01) |
| ***H01M 50/202*** | (2021.01) |
| ***H01M 50/227*** | (2021.01) |
| ***H01M 50/247*** | (2021.01) |

(52) U.S. Cl.

CPC .......... *H01M 50/264* (2021.01); *G01K 1/024* (2013.01); *H01M 50/202* (2021.01); *H01M 50/227* (2021.01); *H01M 50/247* (2021.01); *G01K 2215/00* (2013.01); *H01M 2220/30* (2013.01)

(58) Field of Classification Search

None

See application file for complete search history.

(56) References Cited

U.S. PATENT DOCUMENTS

| | | | |
|---|---|---|---|
| 7,550,943 | B2 | 6/2009 | Spartano et al. |
| 8,506,779 | B2 | 8/2013 | Kahn et al. |
| 9,570,929 | B2 | 2/2017 | Seiler et al. |
| 10,679,481 | B2 | 6/2020 | Safavi et al. |
| 10,838,938 | B2 | 11/2020 | Niina et al. |
| 10,841,669 | B2 | 11/2020 | Gotou et al. |
| 10,924,342 | B2 | 2/2021 | Joshi et al. |
| 11,012,856 | B2 | 5/2021 | Ito |

(Continued)

FOREIGN PATENT DOCUMENTS

| | | | |
|---|---|---|---|
| EP | 4239765 | A1 | 9/2023 |
| JP | 6167353 | B2 | 7/2017 |
| WO | 2020225030 | A1 | 11/2020 |

OTHER PUBLICATIONS

Search Report and Written opinion for PCT Application No. PCT/US2024/048080, dated Dec. 23, 2024, 8 pages.

(Continued)

*Primary Examiner* — Erica S Lin

(74) *Attorney, Agent, or Firm* — Christopher R. Christenson; Kelly, Holt & Christenson, P.L.L.C.

(57) ABSTRACT

An intrinsically-safe battery assembly for field devices, the intrinsically-safe battery assembly includes an intrinsically-safe battery and polymeric chassis. In an example, the polymeric chassis is removably coupled to the intrinsically-safe battery and has at least one retention mechanism configured to engage the intrinsically-safe battery. In another example, the polymeric structure has at least one battery ejection mechanism configured to eject the intrinsically-safe battery. A field device is also provided.

25 Claims, 9 Drawing Sheets

(56) References Cited

U.S. PATENT DOCUMENTS

| | | | | |
|---|---|---|---|---|
| 11,029,675 | B1 | 6/2021 | Blount et al. | |
| 11,165,867 | B2 | 11/2021 | Arai et al. | |
| 11,246,094 | B2 | 2/2022 | Agerstam et al. | |
| 11,388,091 | B2 | 7/2022 | Iwasaki | |
| 11,494,494 | B2 | 11/2022 | Ochiai | |
| 11,500,355 | B2 | 11/2022 | Ochsenreither et al. | |
| 2001/0000945 | A1* | 5/2001 | Watson | H01M 50/213 320/114 |
| 2006/0201558 | A1 | 9/2006 | Marty et al. | |
| 2012/0157018 | A1 | 6/2012 | Robinson et al. | |
| 2013/0164567 | A1* | 6/2013 | Olsson | H01M 10/425 429/93 |
| 2015/0244002 | A1* | 8/2015 | McGuire | H01R 33/95 429/61 |
| 2019/0148815 | A1 | 5/2019 | Aono | |
| 2019/0220255 | A1 | 7/2019 | Taniguchi | |
| 2019/0294471 | A1 | 9/2019 | Taniguchi | |
| 2019/0333129 | A1 | 10/2019 | Taniguchi | |
| 2020/0012249 | A1 | 1/2020 | Allendorf et al. | |
| 2020/0012448 | A1 | 1/2020 | Arai et al. | |
| 2020/0019385 | A1 | 1/2020 | Taniguchi | |
| 2020/0043306 | A1 | 2/2020 | Taniguchi | |
| 2020/0045040 | A1 | 2/2020 | Taniguchi | |
| 2020/0057631 | A1 | 2/2020 | Taniguchi | |
| 2020/0106612 | A1 | 4/2020 | Baba et al. | |
| 2020/0193076 | A1 | 6/2020 | Gotou et al. | |
| 2020/0213853 | A1 | 7/2020 | Fujimoto et al. | |
| 2020/0268261 | A1 | 8/2020 | Ikegami | |
| 2020/0334035 | A1 | 10/2020 | Periaswamy | |
| 2020/0374276 | A1 | 11/2020 | Torigoe et al. | |
| 2021/0005331 | A1 | 1/2021 | Sawada | |
| 2021/0056486 | A1 | 2/2021 | Kawamukal et al. | |
| 2021/0120006 | A1 | 4/2021 | Sawada | |
| 2021/0120008 | A1 | 4/2021 | Sawada | |
| 2021/0306214 | A1 | 9/2021 | Lane et al. | |
| 2021/0356302 | A1 | 11/2021 | Welle et al. | |
| 2022/0022041 | A1 | 1/2022 | Weatherhead et al. | |
| 2022/0067990 | A1 | 3/2022 | Sato | |
| 2022/0120793 | A1 | 4/2022 | Isenmann et al. | |
| 2023/0090299 | A1 | 3/2023 | Neuharth et al. | |

OTHER PUBLICATIONS

Application and Drawings filed for U.S. Appl. No. 18/180,352, filed Mar. 8, 2023, 29 pages.

* cited by examiner

BATTERY ASSEMBLY FOR WIRELESS FIELD DEVICES

BACKGROUND

The present invention relates generally to industrial process control and monitoring systems. More particularly, the present invention relates to wireless process field devices for use in such systems.

In industrial settings, process control systems are used to monitor and control inventories and operation of industrial and chemical processes, and the like. Typically, the system that performs these functions uses field devices distributed at key locations in the industrial process coupled to control circuitry in a control room by a process control loop. The term "field device" refers to any device that performs a function in a distributed control or process monitoring system, including all devices used in the measurement, control, and monitoring of industrial processes. Usually, such field devices have a field-hardened enclosure so that they can be installed outdoors in relatively rugged environments and be able to withstand climatological extremes of temperature, humidity, vibration, and mechanical shock.

Typically, each field device also includes communication circuitry that is used for communicating with a process controller, or other field devices, or other circuitry, over the process control loop. In some installations, the process control loop is also used to deliver a regulated current and/or voltage to the field device for powering the field device. The process control loop also carries data, either in an analog or digital format.

In some installations, wireless technologies are now used to communicate with field devices. Wireless operation simplifies field device wiring and setup. Wireless installations are currently used in which the field device includes a local power source. However, because of power limitations, the functionality of such wireless field devices may be limited.

Wireless field devices may employ an intrinsically-safe local power source that may be replaceable when the energy of the power source becomes depleted or below a selected threshold. When the battery needs to be replaced, it is desirable that the battery is easily replaceable and intrinsically-safe so that it can be replaced in an explosive environment without the requirement for a hot work permit or removing the wireless transmitter from the explosive environment. Alternatively, some wireless field devices may employ a battery as a power source that is not intrinsically-safe.

Intrinsic safety is a term that refers to the ability of the field device to operate safely in potentially volatile environments. For example, the environment in which field devices operate can sometimes be so volatile that an errant spark or sufficiently high surface temperature of an electrical component could cause the environment to ignite and generate an explosion. To ensure that such situations do not occur, intrinsic safety specifications have been developed. Compliance with an intrinsic safety requirement helps ensure that even under fault conditions, the circuitry or device itself cannot ignite a volatile environment. One specification for an intrinsic safety requirement is set forth in: APPROVAL STANDARD INTRINISICALLY SAFE APPARATUS AND ASSOCIATED APPARATUS FOR USE IN CLASS I, II AND III, DIVISION 1 HAZARDOUS (CLASSIFIED) LOCATIONS, CLASS 3610, promulgated by Factory Mutual Research October 1988. Adaptations to comply with additional industrial standards such as Canadian Standards Association (CSA) and the European Cenelec standards are also contemplated.

Many wireless field devices are rated for Division 1 and Zone 0 areas. This means that explosive gases are likely to be present and that very strict criteria are applied to the electronic equipment used in these areas. If a battery does not meet certain energy limiting criteria or is not properly protected from damage when dropped, it cannot be brought into a Class 1 or Zone 0 area without obtaining a hot work permit and taking actions to temporality declassify the area. This is a time-consuming and costly process. While there are some commercially available batteries that may meet short circuit temperature rise requirements for Intrinsically-Safe certification, they are susceptible to damage when dropped from as little as 2 to 3 feet because the battery positive terminal is often sealed with a brittle glass to metal seal.

Another challenge for powering wireless field devices is securing the battery. Wireless field devices are often installed in very harsh industrial environments. Since the battery of a wireless field device may be expected to last for 10 years, the long-term reliability of the connection to the battery is very important. Fretting corrosion is a phenomenon that can occur when the mating parts of a connection move very slightly relative to each other. When this happens, protective coatings on the mating interfaces of the connector are disturbed leading to formation of corrosion that eventually causes the contact resistance to increase and the battery can no longer power the field device.

SUMMARY

An intrinsically-safe battery assembly for field devices, the intrinsically-safe battery assembly includes an intrinsically-safe battery and polymeric chassis. In an example, the polymeric chassis is removably coupled to the intrinsically-safe battery and has at least one retention mechanism configured to engage the intrinsically-safe battery. In another example, the polymeric structure has at least one battery ejection mechanism configured to eject the intrinsically-safe battery. A field device is also provided.

DETAILED DESCRIPTION OF ILLUSTRATIVE EMBODIMENTS

Embodiments described herein generally provide an intrinsically-safe, easily replaceable, single cell, low cost, compact battery assembly for wireless field devices. The battery assembly is suitable for an industrial application and provides a reliable electrical connection that is resistant to vibration, shock, and other environmental stresses. In some embodiments, the battery assembly meets all industry intrinsically-safe requirements allowing it to be removed and replaced in a hazardous location without the need for declassifying the area or obtaining a hot work permit. For example, in some embodiments, the battery assembly may meet all Division 1 and Zone 0 requirements to facilitate such operations in the hazardous environment. Alternatively, in some embodiments, the battery assembly may not have to be intrinsically-safe.

Batteries/power modules are used across many wireless field devices and can be replaced several times over the life of a given field device. Due to this replacement routine, current solutions are limited in terms of efficiency and commissioning time. Embodiments described below provide an intrinsically-safe battery assembly with more efficient battery retention and ejection mechanisms. In some embodiments, both retention features and ejection features are provided in a single polymeric component. The polymeric chassis contains built-in snap retention features which wrap slightly around the power module. Embodiments also provide a rear-mounted battery ejector features that, when squeezed together, push forward and eject the battery by overcoming the retaining force of the retention snaps. The squeeze displacement moves the battery assembly beyond the retention/capture features to obtain a clean ejection. Some embodiments also feature one or more directional guides at the base of the chassis to eliminate rotational and axial movement. These guides interface with corresponding grooves in the battery assembly to lock the battery assembly in place once inserted. These guides also allow the battery assembly to eject without binding.

Figure 1:
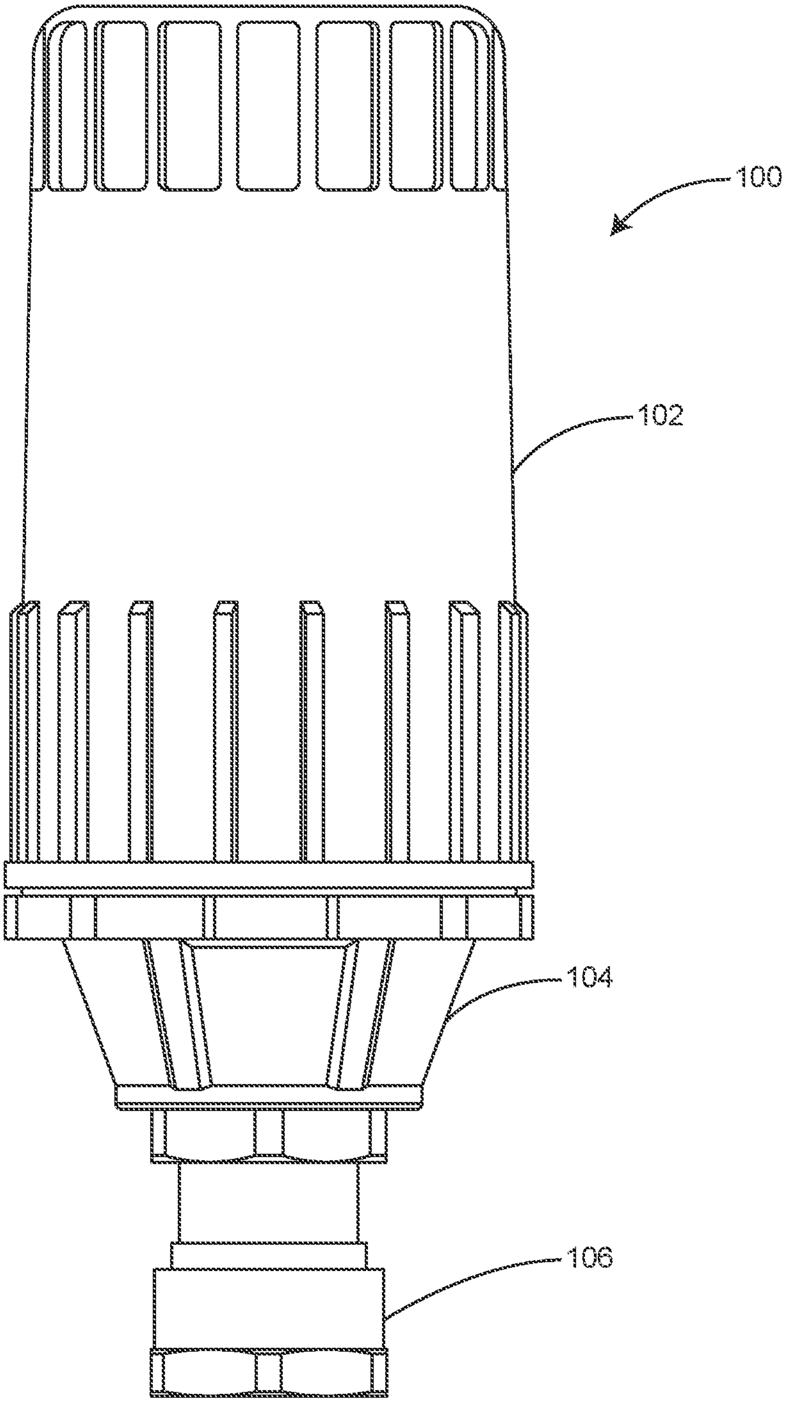
FIG. 1 is a diagrammatic view of a wireless field device with which embodiments described herein are particularly useful.

FIG. 1 is a diagrammatic view of a wireless field device with which embodiments described herein are particularly useful. In the illustrated example, field device 100 is a wireless process variable transmitter that measures a process variable, such as temperature, and wirelessly transmits an indication of the process temperature to a remote device or control room (not shown). Field device 100 includes an enclosed, weather-proof compartment 102 that is removably coupled to sensing adapter 104. As used herein, weatherproof means a covered, watertight enclosure. Sensing adapter 104 may take various forms depending on the type of field element used. For example, if the field element is a process variable temperature sensor, sensing adapter may appear as provided in FIG. 1 and be coupled to a process temperature sensor body 106. Sensor body 106, may then be coupled to an industrial process to measure the temperature of a process fluid. As can be appreciated, different types of sensors (e.g., temperature, pressure, acoustic, corrosion, pH, ORP, conductivity, level, gas, etc.) will have different forms for their respective sensor body 106. However, in one embodiment, sensor adapter 104 allows the variety of sensor bodies 106 to be used with the same enclosure 102. Enclosure 102 and/or sensor body 104 can be constructed from any suitable material as long as enclosure 102 is watertight.

Figure 2:
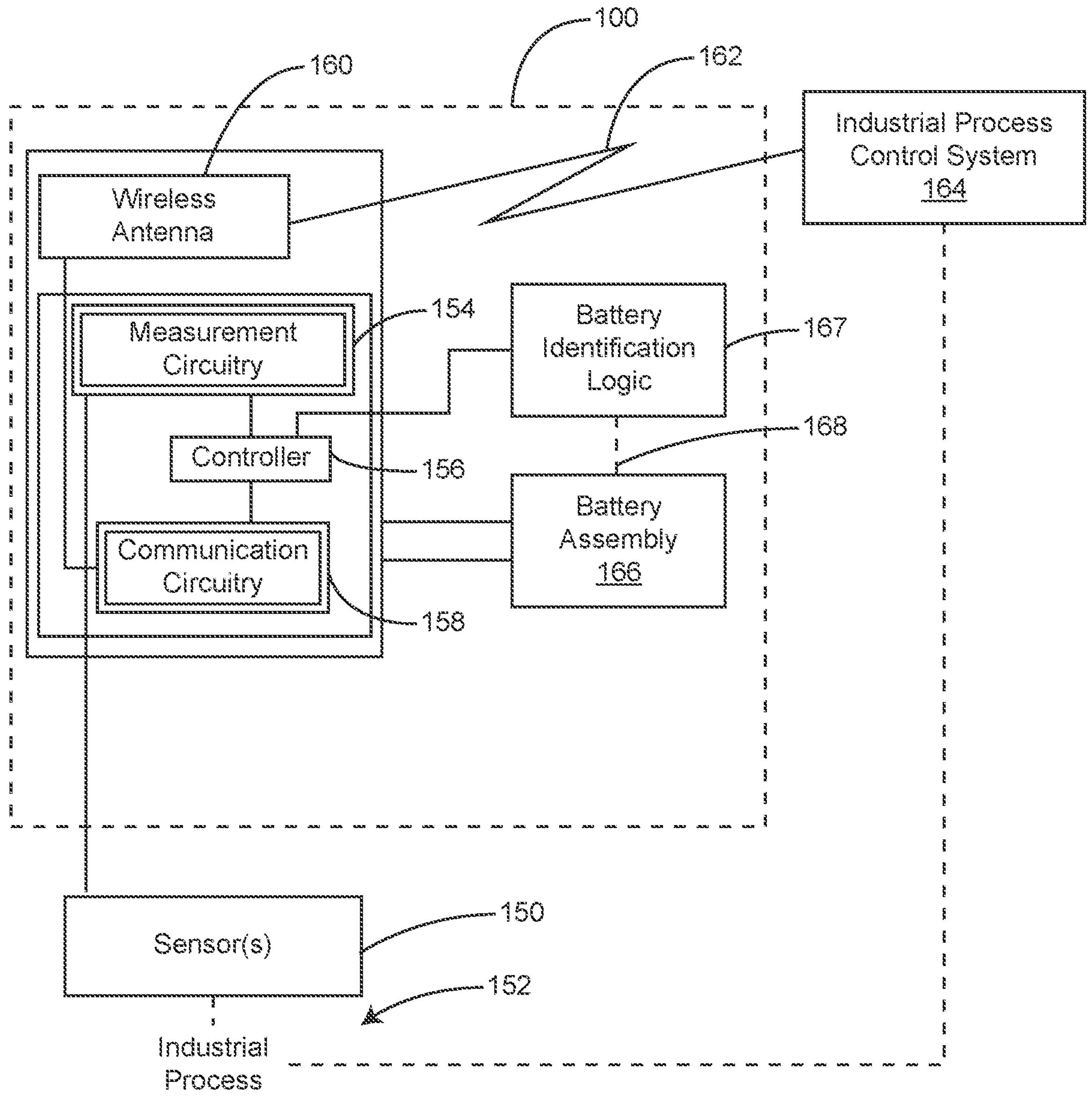
FIG. 2 is a block diagram of a wireless field device.

FIG. 2 is a block diagram of a wireless field device 100. As shown in FIG. 2, wireless field device 100 is coupled to one or more sensors 150, which are, in turn, coupled to an industrial process 152. Sensor(s) s 150 may include one or more of any of the process sensors described above. Sensor (s) 150 is coupled to measurement circuitry 154 of wireless transmitter 100. Measurement circuitry 154 receives an electrical output from sensor(s) 150 that represents a process variable that is sensed from an industrial process 152. Measurement circuitry 154 may include suitable analog-to-digital conversion circuitry to transform an analog sensor signal into a digital representation. Additionally, measurement circuitry 154 may include suitable filter circuitry, amplification circuitry, and/or switching circuitry in order to provide compatibility for a variety of different sensor types. Measurement circuitry 154 provides an output representative of the process state to controller 156.

Controller 156 may be any suitable circuitry or combination of circuitry that executes programmatic steps to generate a process variable output based upon signals received from measurement circuitry 154. In one example, controller 156 is a microprocessor. Controller 156 is also coupled to communication circuitry 158 which can receive the process variable output information from controller 156 and provide wireless industry standard process communication signals based thereon. Preferably, communication circuitry 158 allows bidirectional wireless communication utilizing wireless antenna 160. As shown diagrammatically at reference numeral 162, this bidirectional wireless communication generally communicates with the industrial process control system 164. An example of a suitable wireless process communication protocol is set forth in IEC 62591. However, other examples instead of or in addition to IEC 62591 are also contemplated.

As shown in FIG. 2, wireless field device 100 includes an intrinsically-safe battery assembly 166. Battery assembly 166 is electrically coupled to other circuitry of field device 100 to supply operating power to field device 100. Each battery assembly 166 includes a battery (not shown in FIG. 2) and may include intrinsic safety circuitry (not shown in FIG. 2). The battery may be a primary, non-rechargeable battery or it may be a rechargeable battery. In one embodiment, the battery is a lithium ion, non-rechargeable battery. The battery may be in the form of a C-cell battery (length of about 1.9 inches and diameter of about of 1.02 inches) or a D-cell battery (length of about 2.3 inches and diameter of about of 1.3 inches). Other battery types may also be used.

Wireless field device 100 also preferably includes battery identification circuitry 167 that is coupled to, or part of, controller 156. As will be described in greater detail below, embodiments disclosed herein may generally use different battery form factors (e.g., D-cell and C-cell) for powering wireless field device 100. Since different battery form factors generally provide batteries with different energy storage, battery identification logic 167 allows wireless field device 100 to determine the type of battery assembly 166 used. This allows controller 156 to modify operation of wireless field device 100 based on the type of battery detected by battery identification logic 167. Examples of such modification of operation include, without limitation, limiting or inhibiting available features and/or functions, limiting performance, and limiting a measurement interval.

An example of limiting or inhibiting available features and or functions can include selectively enabling/disabling a local display of the field device based on available power from the identified type of battery assembly used. Another example includes reducing radio-frequency power of the communication circuitry 158 based on the type of battery assembly used. An example of reducing performance of the wireless field device may include selecting a lower power mode of controller 158 or reducing the set of functions it performs and/or when it performs them. An example of limiting a measurement interval includes changing the measurement interval from 10 times per second to one measurement per minute.

Battery identification logic 167 is coupled, either electrically or mechanically, to battery assembly 166, as indicated by dashed line 168. By virtue of coupling 168, battery identification logic 167 is able to determine a form factor of the battery cell within battery 166. This determination may be done using an electrical aspect of battery 166 or a mechanical aspect of battery 166.

Figure 3:
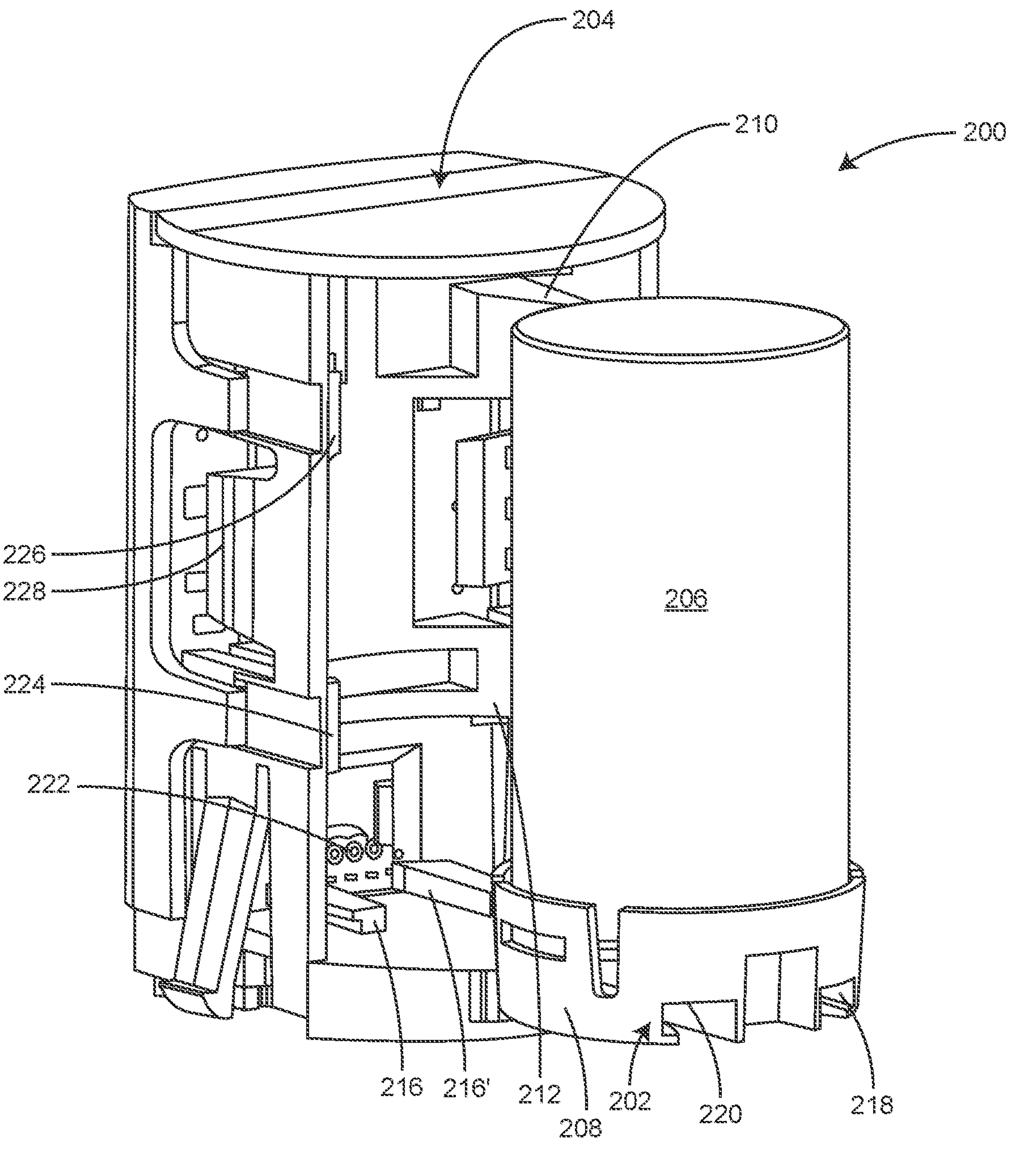
FIG. 3 is a diagrammatic exploded perspective view of a polymeric chassis and battery that form an intrinsically-safe battery assembly in accordance with an embodiment of the present invention.

FIG. 3 is a diagrammatic exploded perspective view of a polymeric chassis and battery that form an intrinsically-safe battery assembly in accordance with an embodiment of the present invention. Intrinsically-safe battery assembly 200 includes intrinsically-safe battery 202 and polymeric chassis 204. As shown, intrinsically-safe battery 202 is removeable from chassis 204 for periodic replacement as the battery becomes depleted. Intrinsically-safe battery 202 includes a primary cell (i.e., non-rechargeable) or secondary cell (i.e., rechargeable) battery 206 coupled to a polymeric circuit board housing 208. In some embodiments, battery 206 is cylindrical, such as a D-cell or C-cell battery. Electrical contact with battery 206 occurs in circuit board housing 208, which may include intrinsic-safety circuitry to ensure that intrinsically-safe battery assembly 202 is intrinsically-safe.

As can be seen in FIG. 3, polymeric chassis 204 includes a pair of semi-circular ribs 212 that are sized and shaped to support an external diameter of battery 206 when battery 206 is mounted within polymeric chassis 204. Additionally, a pair of alignment features 216, 216' are shown in polymeric chassis 204 that cooperate with alignment grooves or channels 218, 220, respectively, to ensure that intrinsically-safe battery assembly 202 slides into polymeric chassis 204 without rotating. This is particularly advantageous as electrical connection between connectors 222 of polymeric chassis 204 and intrinsically-safe battery 202 are preferably pin/receptacle connectors and they would not mate and could potentially be damaged if intrinsically-safe battery 202 were misaligned during insertion.

FIG. 3 also shows a pair of retention features 224, 226 that are positioned to slightly interfere with the outer diameter of battery 206 as battery 206 is inserted. A second pair (not shown) is located on an opposite side of polymeric chassis 204 but is not visible in FIG. 3 because the view is blocked by battery 206. Retention features 224, 226 are located such that when battery 206 is fully inserted into polymeric chassis 204, the interference is reduced. However, retention features help to apply a force component that urges battery 206 into polymeric chassis 204.

FIG. 3 also shows a battery ejection feature 228 that is inwardly deflectable when squeezed to force battery 206 to overcome the inward force of the retention features 224, 226 and eject intrinsically-safe battery assembly 202 from polymeric chassis 204. While FIG. 3 shows one battery ejection feature 228 a similar feature is disposed on an opposite side of polymeric chassis 204 such that a user will squeeze the two ejection features 228 together (for example between a user's thumb and forefinger) and then the intrinsically-safe battery assembly will be ejected into the user's open hand.

Figure 4:
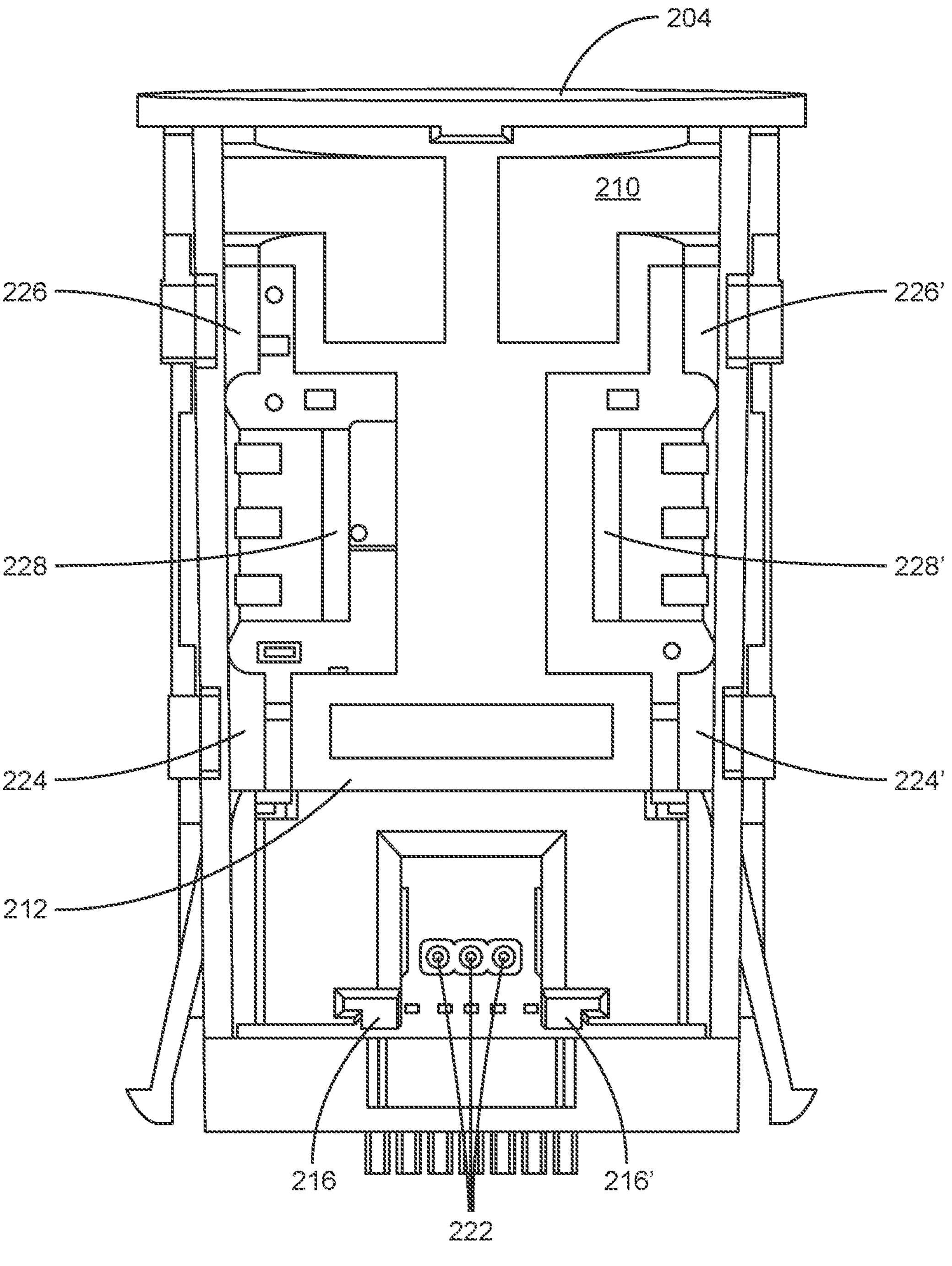
FIG. 4 is a diagrammatic front view of a polymeric chassis of an intrinsically-safe battery assembly in accordance with an embodiment of the present invention.

FIG. 4 is a diagrammatic front view of a polymeric chassis of an intrinsically-safe battery assembly in accordance with an embodiment of the present invention. FIG. 4 shows all battery retention features 224, 224', 226, 226' as well as all battery ejection features 228 and 228'. Additionally, both alignment features 216, 216' are shown in FIG. 4.

Figure 5:
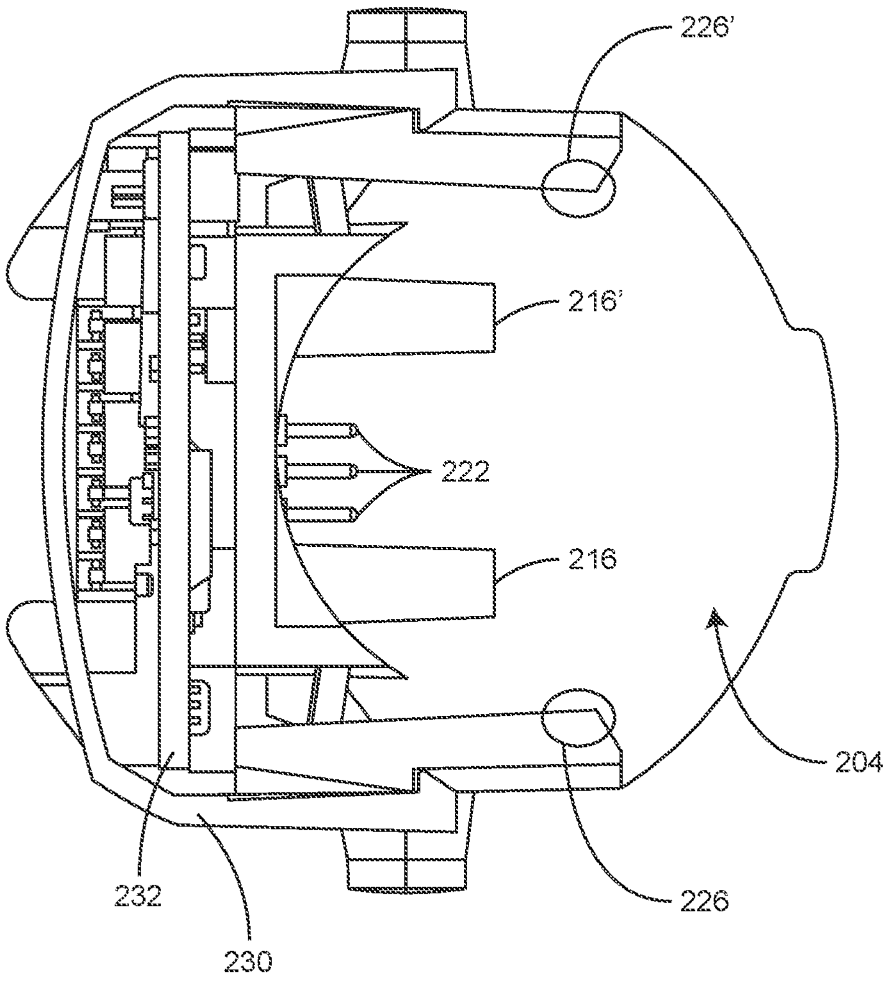
FIG. 5 is a diagrammatic top cross section view of a polymeric chassis of an intrinsically-safe battery assembly in accordance with an embodiment of the present invention.

FIG. 5 is a diagrammatic top cross section view of a polymeric chassis of an intrinsically-safe battery assembly in accordance with an embodiment of the present invention. As shown in FIG. 5, retention features 226 and 226' taper and/or tilt toward one another such that in the circled regions, they are spaced apart by a distance that is less than the outer diameter of battery 206. Thus, battery 206 will cause the circled regions to deform outwardly as the intrinsically-safe battery 202 is inserted.

FIG. 5 also shows polymeric chassis 204 coupled to electronics compartment 230. Electronics compartment 230 houses at least one circuit board 232, which may contain any or all of the circuitry described above with respect to FIG. 2.

Figure 6A:
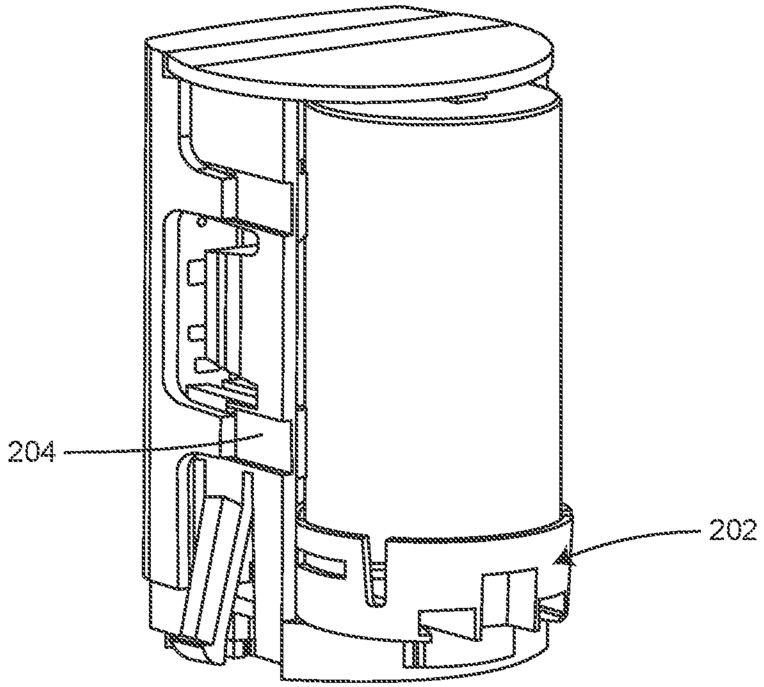
FIGS. 6A and 6B are diagrammatic views showing various degrees of insertion of an intrinsically-safe battery into a polymeric chassis in accordance with an embodiment of the present invention.
Figure 6B:
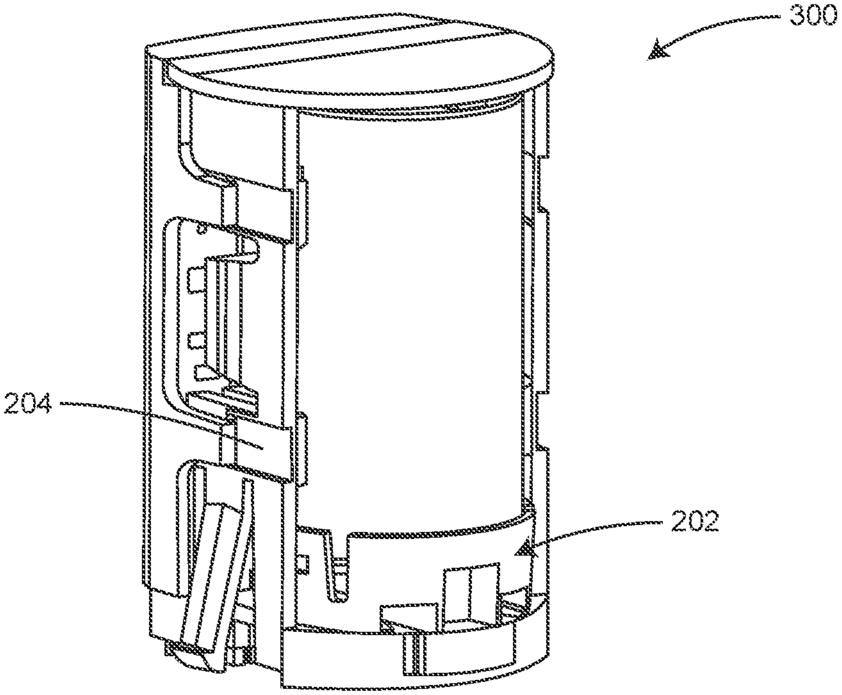

FIGS. 6A and 6B are diagrammatic views showing various degrees of insertion of an intrinsically-safe battery into polymeric chassis in accordance with an embodiment of the present invention. FIG. 6A show intrinsically-safe battery 202 almost fully inserted into polymeric chassis 204 while FIG. 6B shows the completed intrinsically-safe battery assembly 300 formed of intrinsically-safe battery 202 and polymeric chassis 204 fully coupled together.

Figure 7:
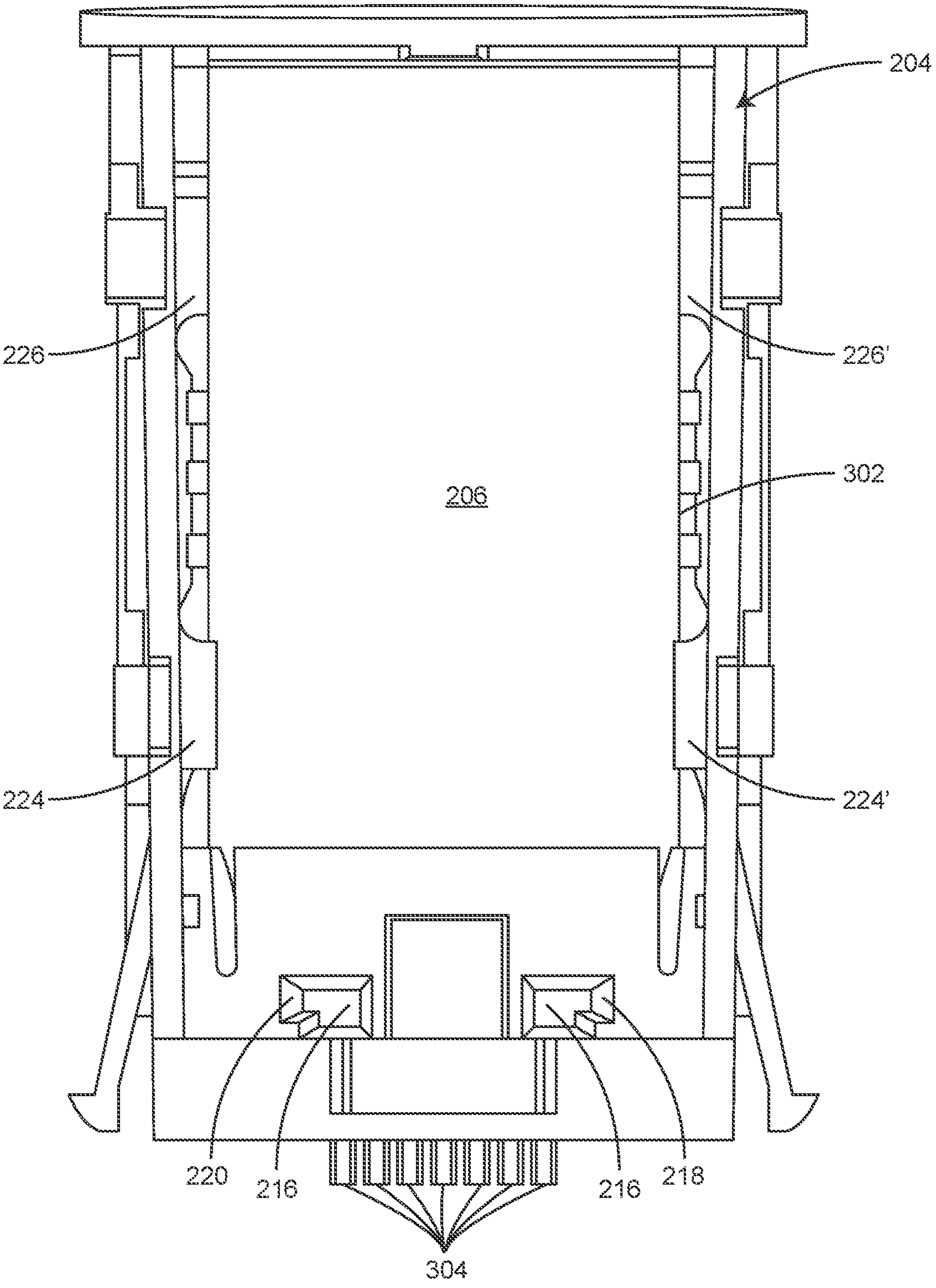
FIG. 7 is a diagrammatic view of an intrinsically-safe battery assembly in accordance with an embodiment of the present invention.

FIG. 7 is a diagrammatic view of an intrinsically-safe battery assembly in accordance with an embodiment of the present invention. As can be seen, battery 206 has an outer diameter 302 that is greater than the distance between battery retention features 224 and 224' as well as greater than the distance between battery retention features 226 and 226'. As such features 224, 224', 226, and 226' operate to exert a force on battery 206 that urges battery 206 into contact with polymeric chassis 204. Additionally, FIG. 7 shows alignment features 216 of polymeric chassis 204 engaged within alignment grooves/channels 218, 220. FIG. 7 also shows a number of conductors 304 that are coupleable to a sensor module to form a completed industrial transmitter.

Figure 8:
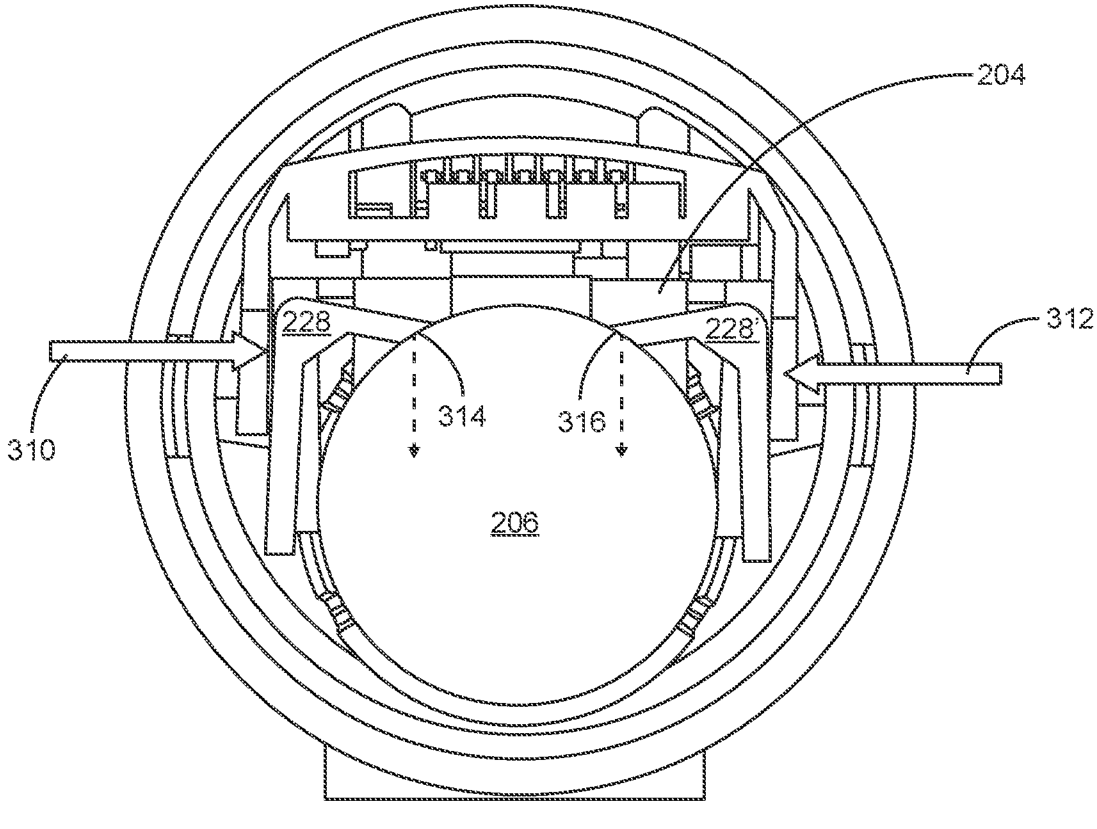
FIG. 8. is a top cross section view of an intrinsically-safe battery being removed from a polymeric chassis in accordance with an embodiment of the present invention.

FIG. 8. is a top view of an intrinsically-safe battery being removed from a polymeric chassis in accordance with an embodiment of the present invention. As shown in FIG. 8, a squeeze force (F_Squeeze) is directed as shown at arrows 310, 312 on ejection features 228, 228'. This causes ejection features 228, 228' to contact batter 206 at interfaces 314, 316, respectively. This contact generates an ejection force (F_Rear) that opposes the retention force (F_front) generated by retention features 224, 224', 226, and 226'. When the ejection force (F_Rear) exceeds the retention force (F_front), battery 206 is ejected from polymeric chassis 204.

Figure 9:
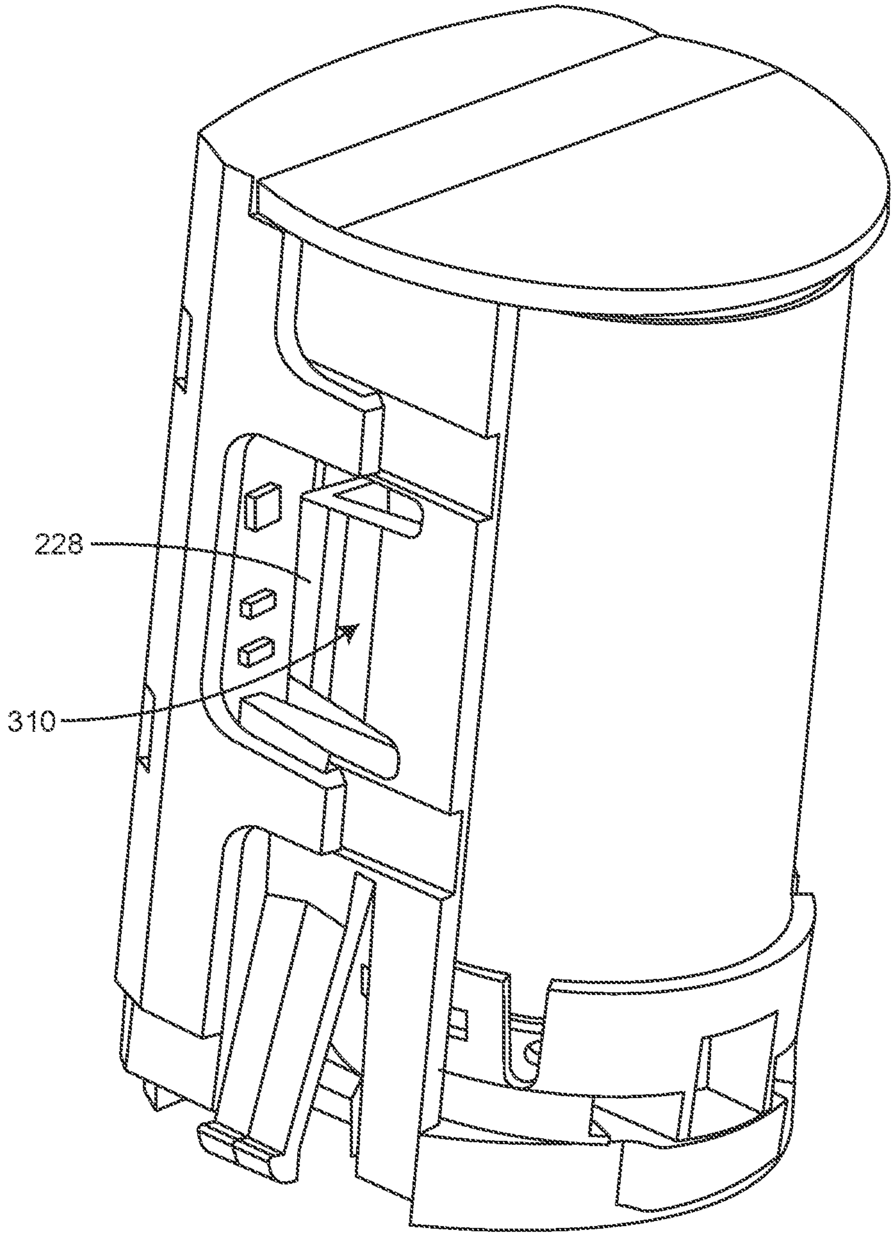
FIG. 9 is a diagrammatic perspective view of an intrinsically-safe battery assembly being removed from a field device in accordance with an embodiment of the present invention.

FIG. 9 is a diagrammatic perspective view of an intrinsically-safe battery being removed from a polymeric chassis in accordance with an embodiment of the present invention. FIG. 9 shows the location of squeeze force 310 on ejection feature 228.

Although the present invention has been described with reference to preferred embodiments, workers skilled in the art will recognize that changes may be made in form and detail without departing from the spirit and scope of the invention.

What is claimed is:

1. An intrinsically-safe battery assembly for field devices, the intrinsically-safe battery assembly comprising:

an intrinsically-safe battery; and a polymeric chassis removably coupled to the intrinsically-safe battery, the polymeric chassis having at least one retention mechanism configured to physically engage the intrinsically-safe battery and at least one battery ejector mechanism coupled to the intrinsically-safe battery; and wherein the intrinsically-safe battery assembly is configured to couple to a field device.

2. The intrinsically-safe battery assembly of claim 1, wherein the at least one retention mechanism includes a plurality of retention mechanisms and wherein the plurality of retention mechanisms is configured to engage an outer diameter of the intrinsically-safe battery.

3. The intrinsically-safe battery assembly of claim 2, wherein engagement of the plurality of retention mechanisms with the outer diameter of the intrinsically-safe battery generates a retention force urging the intrinsically-safe battery into contact with the polymeric chassis.

4. The intrinsically-safe battery assembly of claim 3, wherein the plurality of retention mechanisms includes four retention mechanisms in physical contact with the battery.

5. The intrinsically-safe battery assembly of claim 1, wherein the at least one battery ejection mechanism includes a pair of ejection mechanisms disposed on opposite sides of the intrinsically-safe battery.

6. The intrinsically-safe battery assembly of claim 5, wherein ejection of the intrinsically-safe battery occurs when the pair of ejection mechanisms are squeezed together.

7. The intrinsically-safe battery assembly of claim 5, wherein ejection occurs when a force generated by the ejection mechanisms being squeezed together exceeds a retention force of the at least one retention mechanism.

8. The intrinsically-safe battery assembly of claim 1, wherein the intrinsically-safe battery includes at least one alignment feature and the polymeric chassis includes a second alignment feature and wherein the alignment features cooperate to ensure insertion of the intrinsically-safe battery into the polymeric chassis without rotation.

9. An intrinsically-safe battery assembly for field devices, the intrinsically-safe battery assembly comprising:

an intrinsically-safe battery; and a polymeric chassis removably coupled to the intrinsically-safe battery, the polymeric chassis having at least one battery ejection mechanism physically coupled to the intrinsically-safe battery and configured to eject the intrinsically-safe battery.

10. The intrinsically-safe battery assembly of claim 9, wherein the at least one battery ejection mechanism includes a pair of ejection mechanisms disposed on opposite sides of the intrinsically-safe battery.

11. The intrinsically-safe battery assembly of claim 10, wherein ejection of the intrinsically-safe battery occurs when the pair of ejection mechanisms are squeezed together.

12. A field device comprising:

an intrinsically-safe battery;

a polymeric chassis removably coupled to the intrinsically-safe battery, the polymeric chassis having at least one retention mechanism configured to physically engage the intrinsically-safe battery and at least one ejection feature physically coupled to the intrinsically-safe battery and configured to eject the intrinsically-safe battery;

an electronics housing coupled to the polymeric chassis;

field device electronics disposed within the electronics housing and configured to measure a sensor signal and provide an output.

13. The field device of claim 12, wherein the at least one retention mechanism includes a plurality of retention mechanisms and wherein the plurality of retention mechanisms is configured to engage an outer diameter of the intrinsically-safe battery.

14. The field device of claim 13, wherein engagement of the plurality of retention mechanisms with the outer diameter of the intrinsically-safe battery generate a retention force urging the intrinsically-safe battery into contact with the polymeric chassis.

15. The field device of claim 12, wherein the field device electronics includes wireless communication circuitry.

16. The field device of claim 12, wherein the at least one ejection feature includes a pair of ejection mechanisms disposed on opposite sides of the intrinsically-safe battery.

17. The field device of claim 16, wherein ejection of the intrinsically-safe battery occurs when the pair of ejection mechanisms are squeezed together.

18. A battery assembly for field devices, the battery assembly comprising:

a battery; and a polymeric chassis removably coupled to the battery, the polymeric chassis having at least one retention mechanism configured to physically engage the battery and a battery ejector mechanism coupled to the battery; and wherein the battery assembly is configured to couple to a field device.

19. The battery assembly of claim 18, wherein the at least one retention mechanism includes a plurality of retention mechanisms and wherein the plurality of retention mechanisms is configured to engage an outer diameter of the battery.

20. The battery assembly of claim 19, wherein engagement of the plurality of retention mechanisms with the outer diameter of the battery generates a retention force urging the battery into contact with the polymeric chassis.

21. The battery assembly of claim 20, wherein the plurality of retention mechanisms includes four retention mechanisms.

22. The battery assembly of claim 18, wherein the at least one battery ejection mechanism includes a pair of ejection mechanisms disposed on opposite sides of the battery.

23. The battery assembly of claim 22, wherein ejection of the battery occurs when the pair of ejection mechanisms are squeezed together.

24. The battery assembly of claim 23, wherein ejection occurs when a force generated by the ejection mechanisms being squeezed together exceeds a retention force of the at least one retention mechanism.

25. The battery assembly of claim 18, wherein the battery includes at least one alignment feature and the polymeric chassis includes a second alignment feature and wherein the alignment features cooperate to ensure insertion of the battery into the polymeric chassis without rotation.

* * * * *